(12) United States Patent
Christopher et al.

(10) Patent No.: US 8,151,573 B2
(45) Date of Patent: Apr. 10, 2012

(54) TURBOMACHINE FLAMEOUT CONFIRMATION

(75) Inventors: Matthew Christopher, Laveen, AZ (US); Hanif Vhora, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 729 days.

(21) Appl. No.: 12/266,279

(22) Filed: Nov. 6, 2008

(65) Prior Publication Data

US 2010/0107591 A1    May 6, 2010

(51) Int. Cl.
*F02C 7/00* (2006.01)

(52) U.S. Cl. ............... 60/779; 60/803; 60/39.091

(58) Field of Classification Search .............. 60/39.091, 60/39.281, 39.37, 773, 779, 795, 803
See application file for complete search history.

(56) References Cited

U.S. PATENT DOCUMENTS

| | | | |
|---|---|---|---|
| 3,805,517 A * | 4/1974 | Sewell et al. | 60/39.091 |
| 5,107,673 A | 4/1992 | Sato et al. | |
| 5,163,316 A | 11/1992 | Toyoda et al. | |
| 5,235,802 A | 8/1993 | Barnum et al. | |
| 5,551,227 A | 9/1996 | Moulton et al. | |
| 5,581,995 A * | 12/1996 | Lucenko et al. | 60/779 |
| 5,694,760 A * | 12/1997 | Baxter | 60/773 |
| 5,755,090 A | 5/1998 | Hu | |
| 5,896,736 A | 4/1999 | Rajamani | |
| 5,961,314 A | 10/1999 | Myhre et al. | |
| 6,013,919 A | 1/2000 | Schneider et al. | |
| 6,247,300 B1 | 6/2001 | Muramatsu et al. | |
| 6,442,943 B1 | 9/2002 | Harrison et al. | |
| 6,516,263 B1 | 2/2003 | Keller | |
| 6,978,597 B2 | 12/2005 | McKelvey et al. | |
| 7,743,599 B2 * | 6/2010 | Taware et al. | 60/39.091 |
| 2002/0197575 A1 | 12/2002 | Neufield et al. | |
| 2005/0274115 A1 | 12/2005 | Pearce | |
| 2007/0207422 A1 | 9/2007 | Cueva | |

* cited by examiner

*Primary Examiner* — Louis Casaregola
*Assistant Examiner* — Phutthiwat Wongwian
(74) *Attorney, Agent, or Firm* — Ingrassia Fisher & Lorenz, P.C.

(57) ABSTRACT

Methods and apparatus are provided for detecting a flameout of an operating turbomachine that is configured to receive a controlled flow of bleed air from a bleed air source and a controlled flow of fuel from a fuel source. A value of an operational parameter within the turbomachine is detected and a determination is made as to whether it has varied by a predetermined amount. If the operational parameter has varied by the predetermined amount, a flameout confirmation test is triggered. The flameout confirmation test includes holding the controlled flow of bleed air constant, commanding an increase in turbomachine speed, and confirming that a flameout has occurred by detecting that the controlled fuel flow to the turbomachine is at a maximum fuel flow limit and that actual turbomachine speed differs from the commanded turbomachine speed by a predetermined speed error.

9 Claims, 6 Drawing Sheets

TURBOMACHINE FLAMEOUT CONFIRMATION

STATEMENT REGARDING FEDERALLY SPONSORED RESEARCH OR DEVELOPMENT

This invention was made with Government support under Contract No. N00019-02-C-3002, awarded by the U.S. Navy. The Government has certain rights in this invention.

TECHNICAL FIELD

The present invention generally relates to gas turbine engines and, more particularly, to a system and method for selectively confirming whether a flameout has occurred in a turbomachine.

BACKGROUND

Gas turbine engines, sometimes referred to as turbomachines, may be used in various environments to, among other things, generate electrical power, provide propulsion, supply compressed air for various pneumatic loads, and drive various mechanical loads. A typical gas turbine engine includes at least a compressor, a combustor, and a turbine. The compressor draws in ambient air, compresses the air, and supplies the compressed air to the combustor. The combustor receives the compressed air from the compressor, and a controlled flow of fuel from a fuel source and, via igniters, ignites the air-fuel mixture to generate high energy gas. The high energy gas is supplied to the turbine and, upon impinging blades within the turbine, causes the turbine to rotate.

The above-described turbomachine operational mode is a standard open cycle operational mode. However, some turbomachines may be configured to be selectively operated in other operational modes. For example, a turbomachine may also be configured to operate in a closed cycle mode. In this operational mode, fuel is not supplied to the combustor, and compressed air is supplied from an external compressed air source, such as bleed air from another gas turbine engine. While operating in the closed cycle mode, the compressed air that is supplied from the external source may decrease to an undesirably low pressure. When this occurs, fuel may be introduced to the turbomachine combustor and ignited to supplement the energy from the external compressed air source. This latter operational mode is sometimes referred to as a burn and bleed mode.

During burn and bleed mode operation of a turbomachine, it can be quite difficult to detect a flameout event. This is because the turbomachine speed and power may be maintained by the energy of the externally supplied compressed air. If an undetected flameout occurs during bleed and burn operation, fuel will continue to be supplied to the turbomachine, resulting in non-combusted fuel being wastefully exhausted.

Hence, there is a need for a system and method of accurately detecting a flameout condition in a turbomachine, especially during a bleed and burn operational mode. There is also a need for a system and method of determining, if a flameout condition exists, whether a relight attempt should be made. The present invention addresses one or more of these needs.

BRIEF SUMMARY

In one embodiment, and by way of example only, a method of detecting a flameout of an operating turbomachine that is configured to receive a controlled flow of bleed air from a bleed air source and a controlled flow of fuel from a fuel source includes detecting that a value of an operational parameter within the turbomachine has varied by a predetermined amount and, if the operational parameter has varied by the predetermined amount, triggering a flameout confirmation test. The flameout confirmation test includes holding the controlled flow of bleed air constant, commanding an increase in turbomachine speed, and confirming that a flameout has occurred by detecting that (i) the controlled fuel flow to the turbomachine is at a maximum fuel flow limit and (ii) actual turbomachine speed differs from the commanded turbomachine speed by a predetermined speed error.

In another exemplary embodiment, a controller for detecting a flameout of an operating turbomachine that is configured to receive a controlled flow of bleed air and a controlled flow of fuel includes flameout self-test activation logic and flameout confirmation logic. The flameout self-test activation logic is adapted to receive a signal representative of a value of an operational parameter within the turbomachine and is operable to determine if the operational parameter has varied by a predetermined amount. The flame out self-test activation logic is further operable, upon determining that the operational parameter has varied by the predetermined amount, to generate a trigger signal, command a constant flow of bleed air to the turbomachine, and command an increase in turbomachine speed. The flameout confirmation logic is coupled to receive the trigger signal, a turbomachine speed error signal, and a signal indicating that the controlled flow of fuel is at a maximum. The flameout confirmation logic responsive to these signals to determine if turbomachine speed error exceeds a predetermined speed error value and, if so, generate a flameout confirmation signal confirming that a flameout has occurred.

In yet another exemplary embodiment, a turbomachine control system includes a turbomachine, a speed sensor, a temperature sensor, and a turbomachine controller. The turbomachine is coupled to receive a controlled flow of bleed air from a bleed air source and a controlled flow of fuel from a fuel source. The turbomachine is responsive to the controlled flow of bleed air and the controlled flow of fuel to rotate. The speed sensor is operable to sense the rotational speed of the turbomachine and supply a rotational speed signal representative thereof. The temperature sensor is operable to sense exhaust gas temperature of the turbomachine and supply an exhaust gas temperature signal representative thereof. The turbomachine controller is coupled to receive the rotational speed signal and the exhaust gas temperature signal and is operable, in response thereto, to determine turbomachine speed error and supply a speed error signal representative thereof, determine exhaust gas temperature rate of change and supply an EGT rate signal representative thereof, and selectively generate a flameout confirmation signal representative of a confirmation that a flameout has occurred. The turbomachine controller includes flameout self-test activation logic and flameout confirmation logic. The flameout self-test activation logic is coupled to receive the speed error signal and the EGT rate signal and is operable to determine if at least one of the turbomachine speed error exceeds a first predetermined speed error value or the EGT rate exceeds a predetermined rate value and, if so, to generate a trigger signal, command a constant flow of the bleed air to the turbomachine, and command an increase in turbomachine speed. The flameout confirmation logic is coupled to receive the trigger signal, a signal representative of turbomachine speed error, and a signal indicating that the flow of fuel is at a maximum. The flameout confirmation logic is responsive to these signals to determine if the turbomachine speed error exceeds a second predetermined speed error value and, if so, generate the flameout confirmation signal.

Furthermore, other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
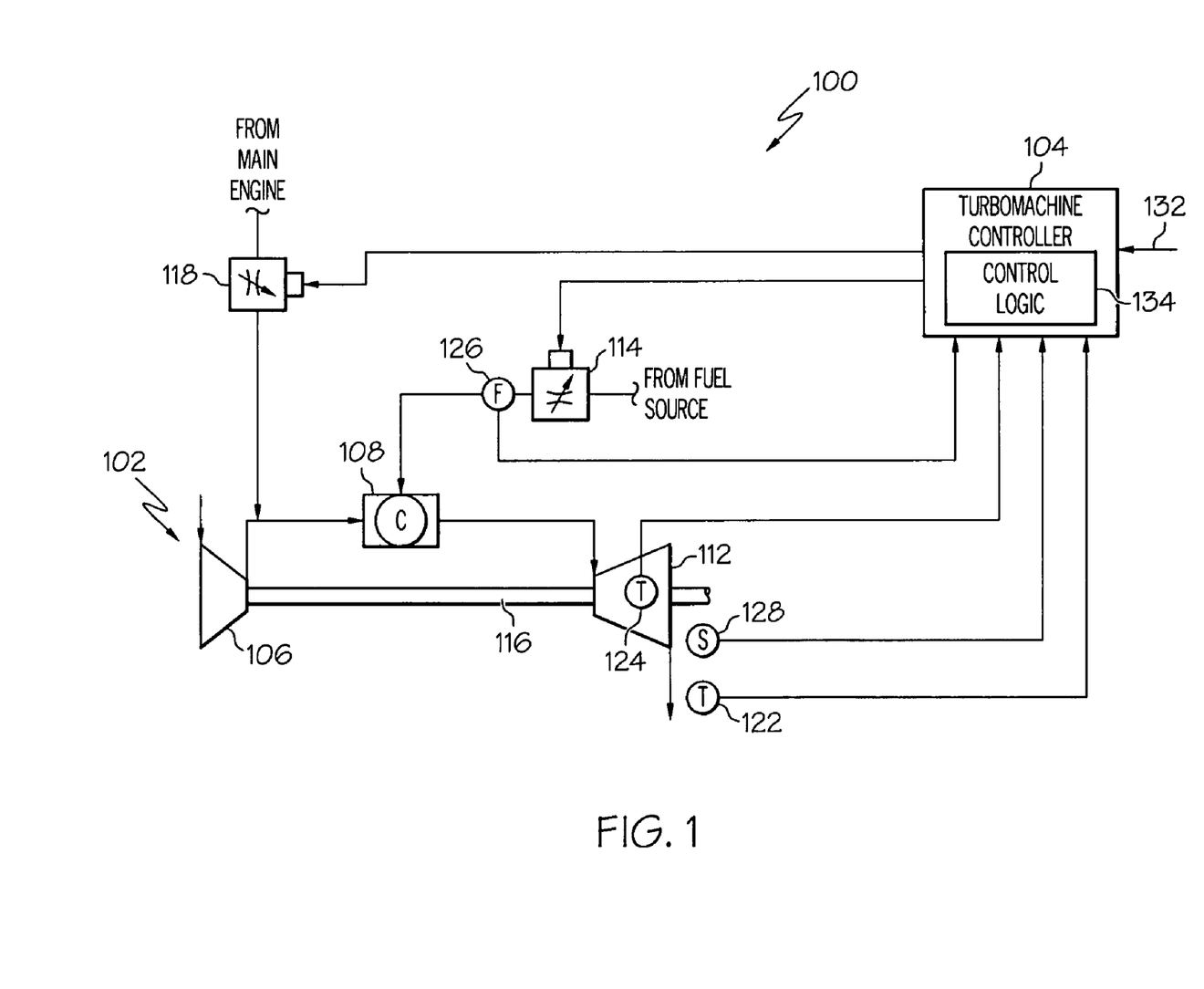
FIG. 1 depicts a schematic representation of an exemplary turbomachine control system that may implement the present invention.

Referring now to FIG. 1, a schematic representation of an exemplary turbomachine control system 100 is depicted and includes a turbomachine 102 and a turbomachine controller 104. The turbomachine 102 includes a compressor 106, a combustor 108, and a turbine 112. When the turbomachine system 100 is configured to operate in its standard, open cycle mode, the compressor 106 draws in ambient air, compresses it, and directs the compressed air into the combustor 108. In the depicted embodiment, only a single compressor 106 is shown, though it will be appreciated that one or more additional compressors could be used.

In the combustor 108, the compressed air supplied from the compressor 106 is mixed with fuel controllably supplied from a non-illustrated fuel source via, for example, a fuel metering valve 114. The fuel/air mixture is combusted, via non-illustrated igniters, to generate high energy combusted gas that is then directed into the turbine 112. The turbine 112 may include one or more turbines. In the depicted embodiment, only a single turbine is included. No matter the particular number, the combusted gas from the combustor 108 expands through the turbine 112, causing it to rotate. As the turbine 112 rotates, it drives the compressor 106 via a spool 116.

The depicted turbomachine system 100 may also be configured to operate in a closed cycle operational mode and in a burn and bleed mode. In the closed cycle mode, as was noted above, fuel is not supplied to the combustor 108, and compressed air is controllably supplied to the turbomachine 102 from a non-illustrated external compressed air source via, for example, one or more regulator valves 118 (for clarity, only one depicted). In the depicted embodiment the external compressed air source is bleed air from another gas turbine engine, such as a main propulsion engine. It will be appreciated, however, that this is merely exemplary, and that the external compressed air source could be any one of numerous other suitable sources.

No matter the particular external compressed air source, the compressed air that is supplied from the external source may decrease due, for example, to a transient associated with one or more other pneumatic loads being supplied by the external compressed air source. During such an occurrence, the turbomachine system 100 may configure itself to operate in the burn and bleed mode. In this operational mode, fuel is controllably supplied to the combustor 108 and ignited to supplement the energy from the external compressed air source.

The turbomachine controller 104 controls the operation of the turbomachine 102. More specifically, the turbomachine controller 104 receives signals from various sensors and systems and, in response to these signals, controls the turbomachine system 100 to operate in the closed cycle mode, the open cycle mode, and the burn and bleed mode. Included among the signals supplied to the turbomachine controller 104 are an exhaust gas temperature (EGT) signal, which is supplied from an EGT sensor 122, one or more other turbine temperature signals, which may be supplied from one or more other turbine temperature sensors 124 (for clarity, only one depicted), a fuel flow signal, which may be supplied from a fuel flow sensor 126, and a rotational speed signal, which is supplied from a speed sensor 128 in the engine 100. The turbomachine controller 104 may also receive one or more signals 132 from one or more external systems including, for example, various signals from the external compressed air source.

Figure 2:
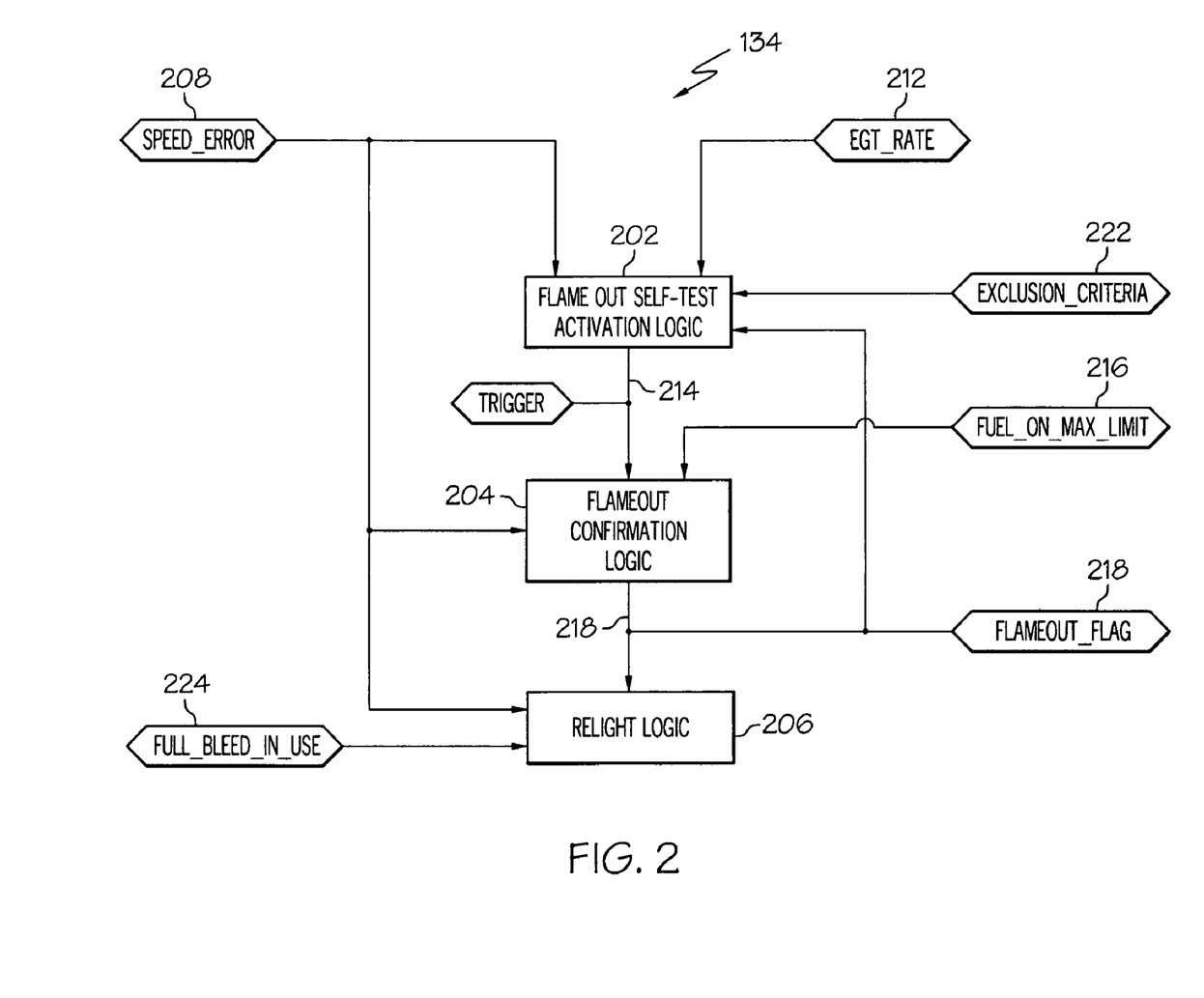
FIG. 2 depicts a functional block diagram of control logic that may be implemented in the system of FIG. 1.

The manner in which the turbomachine controller 104 operates to control the overall operation of the turbomachine 102 in the various operational modes may vary. Indeed, such variations may be readily apparent to a person of skill in the art. Moreover, a description of the control during the various operational modes is not needed to fully describe or enable the claimed invention, and will therefore not be further provided. During operation of the turbomachine system 100 in the burn and bleed mode, the turbomachine controller 104, in addition to controlling the operation of the turbomachine 102, implements control logic 134 that accurately detects a flameout condition. More specifically, the turbomachine controller 104 detects whether a value of an operational parameter within the turbomachine has varied by a predetermined amount. If the control logic 134 determines that the operational parameter has varied by the predetermined amount, it triggers a flameout confirmation test. The flameout confirmation test includes holding the flow of compressed air from the compressed air source to the turbomachine 102 constant and commanding an increase in turbomachine speed. The control logic 134 then confirms that a flameout has occurred if the controlled fuel flow to the turbomachine is at a maximum fuel flow limit and actual turbomachine speed differs from the commanded turbomachine speed by a predetermined speed error. A functional block diagram of the control logic 134 is depicted in FIG. 2, and with reference thereto will now be described.

The control logic 134 includes flameout self-test activation logic 202, flameout confirmation logic 204 and, at least in the depicted embodiment, relight logic 206. The flameout self-test logic 202 is configured to detect whether a value of an operational parameter within the turbomachine 102 has varied by a predetermined amount and, if so, triggers a flameout confirmation test. The specific operational parameter (or parameters) used by the flameout control logic 202 may vary. In the depicted embodiment, however, the flameout self-test activation logic 202 uses two parameters—turbomachine speed error and EGT rate of change. Thus, as FIG. 2 depicts, the flameout self-test activation logic 202 is coupled to receive a speed error value 208 (Speed_Error) and an EGT rate value 212 (EGT_Rate). The flameout self-test activation logic 202, based on these values, determines if at least one of the turbomachine speed error exceeds a first predetermined speed error value or the EGT rate exceeds a predetermined negative rate value. If so, the flameout self-test logic 202 triggers the flameout confirmation test.

The flameout self-test logic 202 triggers the flameout confirmation test via a trigger signal 214 (Trigger), which is supplied to the flameout confirmation logic 204. The trigger signal 214, at least in the depicted embodiment, is implemented as a binary value (e.g., either a logical "1" value or logical "0" value). The flameout self-test activation logic 202 additionally triggers the flameout confirmation test by commanding, or causing the turbomachine controller 104 to command, the constant flow of compressed air to the turbomachine 102, and the increase in turbomachine speed. The reason for this will be described further below. Before proceeding further it is noted that the trigger signal 214 could be used to command (or cause the turbomachine controller 104 to command) the constant flow of compressed air to the turbomachine 102 and the increase in turbomachine speed. Alternatively, the flameout self-test activation logic 202 could generate one or more separate signals to implement this functionality.

Returning once again to the description of the control logic 134, it is seen that the flameout confirmation logic 204 is coupled to receive the trigger signal 214. This logic 204 is additionally coupled to receive the speed error value 208 and a maximum fuel limit value 216 (Fuel_on_Max_Limit). The maximum fuel limit value 216, like the trigger signal 214, is preferably a binary value, and indicates that the flow of fuel to the turbomachine 102 is at a preset maximum fuel flow limit. The flameout confirmation logic 204 is responsive to these signals to determine whether or not a flameout has occurred, and to supply a flameout confirmation signal 218 (Flameout_Flag) representative of the determination. More specifically, and as will be described further below, if the trigger signal 214 and the maximum fuel limit value are both at logical "1" values (e.g., fuel flow is at the maximum fuel flow limit), and turbomachine speed error exceeds a second predetermined speed error value, then the flameout confirmation signal 218 is a logical "1" value (flameout confirmed). If, however, one or more of these three conditions is not met, then the flameout confirmation signal 218 is a logical "0" value (flameout not confirmed).

As FIG. 2 further depicts, the flameout self-test activation logic 202 is additionally coupled to receive an exclusion criteria signal 222 (Exclusion_Criteria) and the flameout confirmation signal 218 from the flameout confirmation logic 204. The exclusion criteria signal 222 is supplied from exclusion criteria logic, which is described further below, and is preferably implemented as a binary value. The flameout self-test activation logic 202, based in part on these two signals, selectively resets the trigger signal to a logical-0 value, thereby preventing the flameout confirmation test from being triggered.

The relight logic 206, if included, is coupled to receive the flameout confirmation signal 218, the turbomachine speed error value 208, and a full bleed signal 224 (Full_Bleed_In_Use). The full bleed signal 224 is a binary signal, and is a logical "1" value if the flow of compressed air to the turbomachine is at a predetermined limit, and is a logical "0" value otherwise. The relight logic 206 is responsive to these signals to selectively generate a relight command to attempt a relight of the fuel in the combustor 104. More specifically, if the flameout confirmation signal 218 is a logical "1", and if either the turbomachine speed error exceeds the predetermined speed error value or the full bleed signal 224 is a logical "1", then a relight command is generated.

Figure 3:
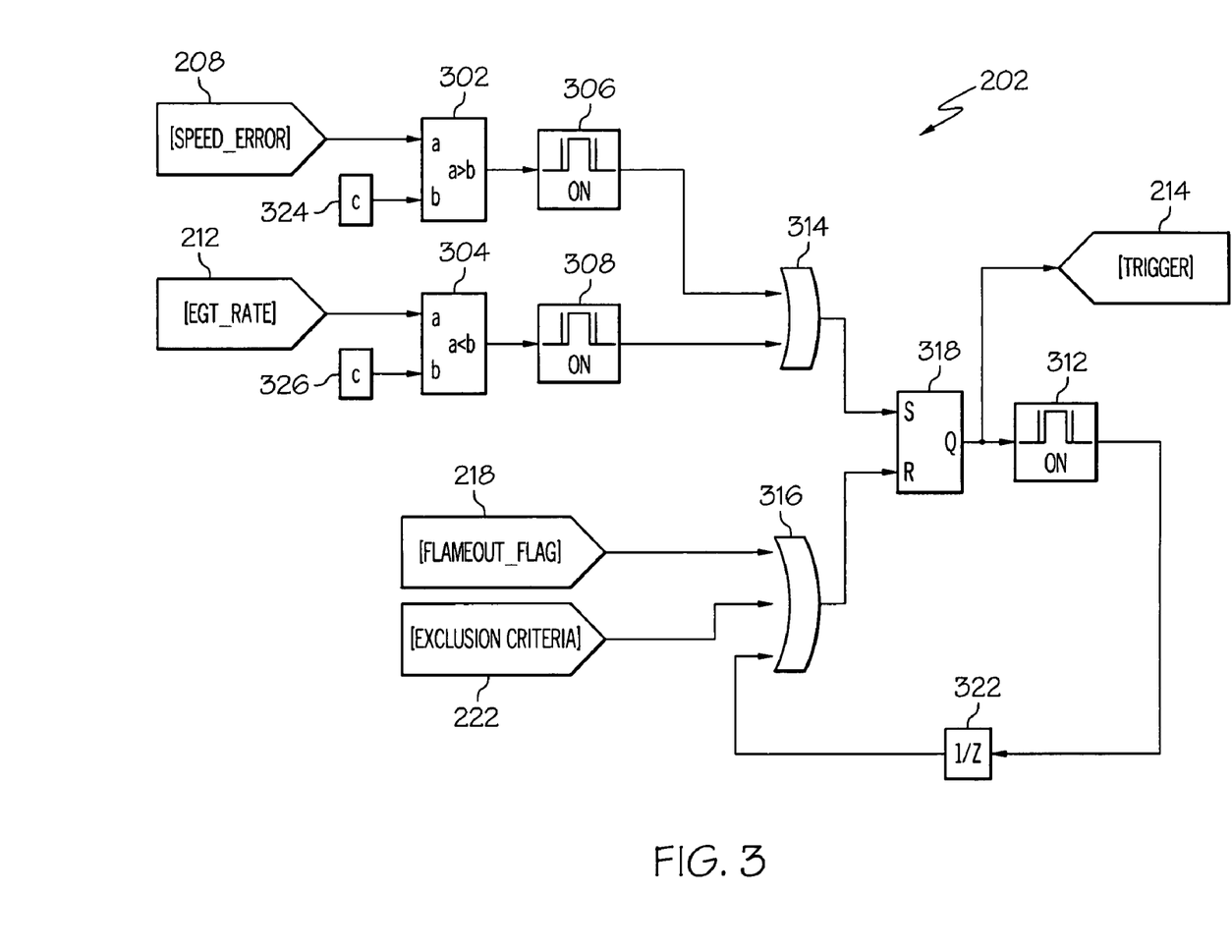
FIG. 3 depicts a schematic representation of flame out self-test activation logic that may be used to implement the control logic of FIG. 2.
Figure 4:
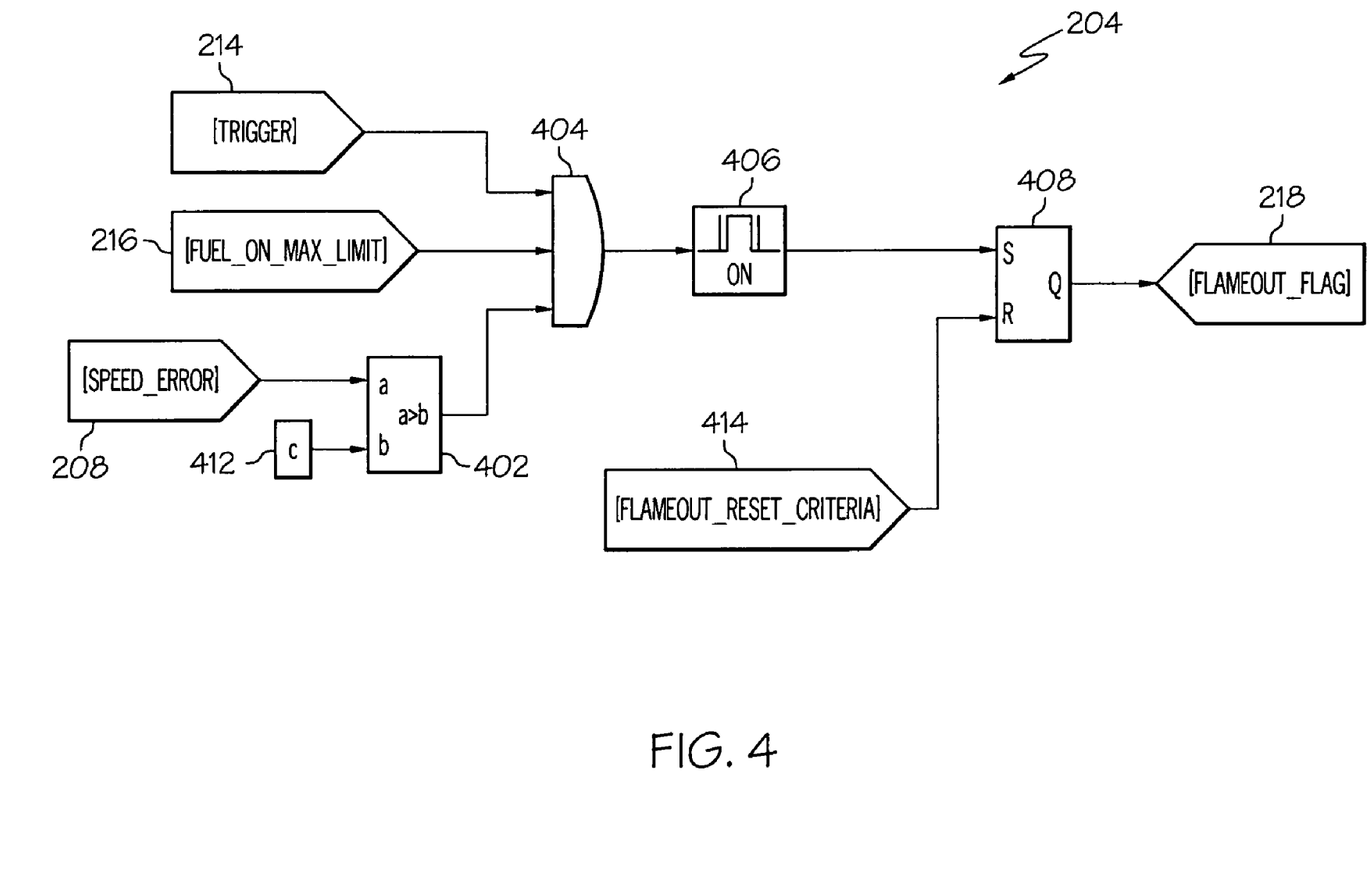
FIG. 4 depicts a schematic representation of flameout confirmation logic that may be used to implement the control logic of FIG. 2.
Figure 5:
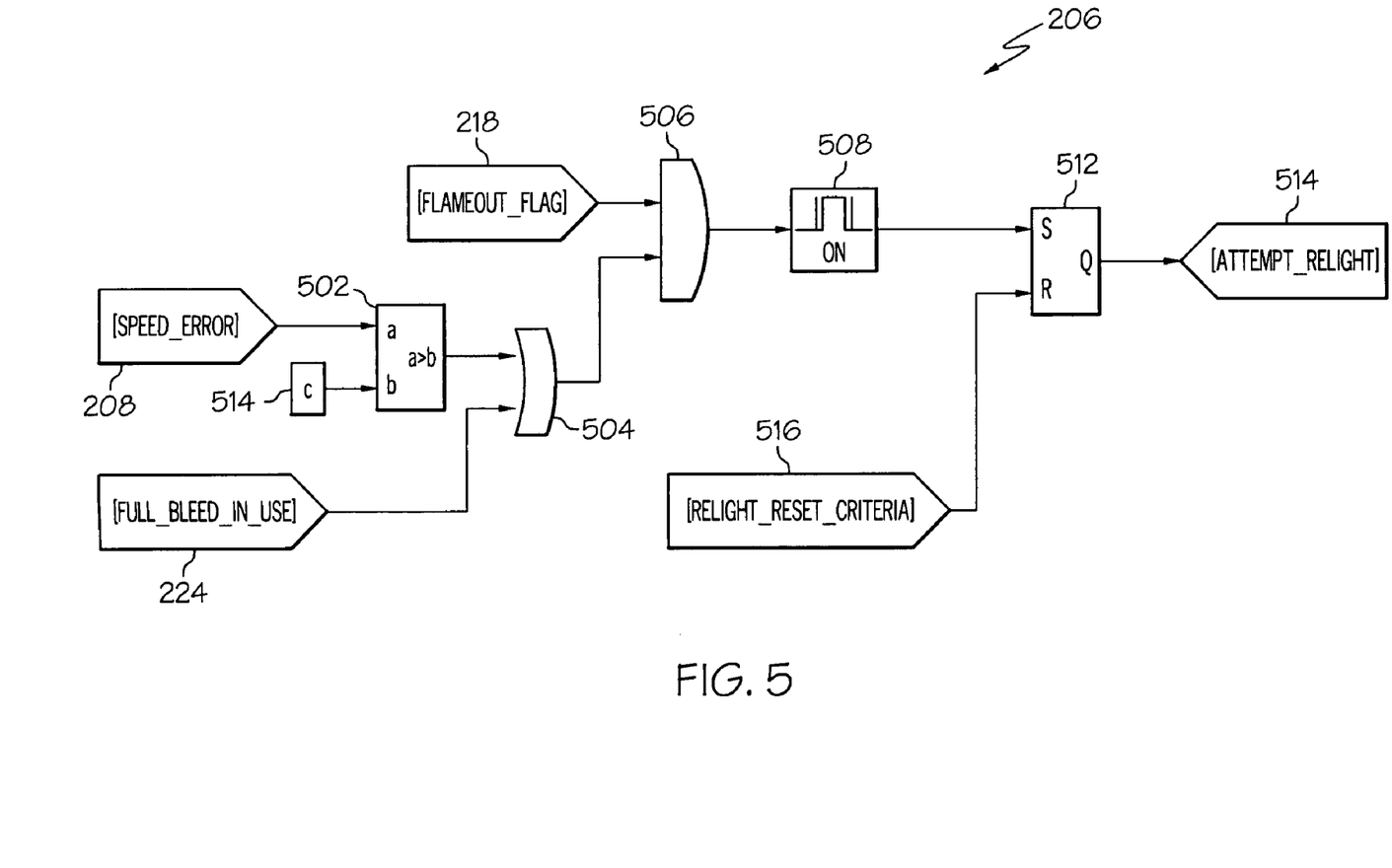
FIG. 5 depicts a schematic representation of relight logic that may be used to implement the control logic of FIG. 2.

The flameout self-test activation logic 202, the flameout confirmation logic 204, and the relight logic 206 may each be variously implemented. Simplified functional block diagrams of embodiments of each of these logics are depicted in FIGS. 3-5, respectively, and for completeness will now be described in more detail. Before doing so, however, it is noted that each logic is depicted using various schematic symbols that represent physical components. It will be appreciated that this is done for clarity and ease of description, and that each logic could be implemented using one or more of these discrete physical components or each could be implemented fully in software or using a combination of hardware and software.

The flameout self-test activation logic 202, to implement its functionality, includes a first comparator 302, a second comparator 304, first, second, and third confirm-on functions 306, 308, and 312, respectively, first and second OR logic 314 and 316, respectively, a set-reset (S/R) latch 318, and a delay function 322. The first comparator 302 receives and compares the speed error value 208 and a first predetermined speed error value 324. If the speed error value 208 is greater than the first predetermined speed error value 324, then the first comparator 302 supplies a logical "1" value, otherwise it supplies a logical "0" value. The second comparator 304 receives and compares the EGT rate value 212 and the predetermined EGT rate value 326. If the EGT rate value 212 is a greater negative value than the predetermined EGT rate value 324, then the second comparator 304 supplies a logical "1" value, otherwise it supplies a logical "0" value.

The first confirm-on function 306 is coupled to the output of the first comparator 302, and the second confirm-on function 308 is coupled to the output of the second comparator 304. The first and second confirm-on functions 306, 308 each normally supply a logical "0" value, but will supply a logical "1" value if the respective inputs receive a logical "1" value for a predetermined time period. The confirm-on functions 306, 308 thereafter immediately supply a logical "0" value when the respective inputs return to a logical "0" value. The predetermined time periods for each confirm-on function 306, 308 may be set to meet desired operational characteristics. In the context of the flameout self-test actuation logic 202 it may thus be seen that the first confirm-on function 306 supplies a logical "1" value whenever the speed error value 208 is greater than the first predetermined speed error value 324 for a first predetermined time period, and the second confirm-on function 308 supplies a logical "1" whenever the EGT rate value 212 is a greater negative value than the predetermined EGT rate value 326 for a second predetermined time period.

The first OR logic 314 includes two inputs, one of which is coupled to the output of the first confirm-on function 306 and the other of which is coupled to the second confirm-on function 308. The first OR logic 314, as is generally known, will supply a logical "1" value whenever either, or both, of its inputs are receiving a logical "1" value. Hence, whenever either, or both, of the first and second confirm-on functions 306, 308 supply a logical "1" value, the first OR logic 314 will supply a logical "1" to the S-input of the S/R latch 318. As is generally known, if the S-input of a S/R latch 318 is supplied with a logical "1" value while its R-input is supplied with a logical "0" value, then the Q-output goes to, and remains at, a logical "1" value, even when the S-input is subsequently supplied with a logical "0" value. Similarly, if the R-input is supplied with a logical "1" value while its S-input is supplied with a logical "0" value, then the Q-output goes to, and remains at, a logical "0" value, even when the R-input is subsequently supplied with a logical "0" value.

From the above, it will thus be appreciated that whenever the speed error value 208 is greater than the first predetermined speed error value 324 or the EGT rate value 212 is a greater negative value than the predetermined EGT rate value 326, and the R-input is supplied with a logical "0" value, then the Q-output (e.g., the trigger signal 214) goes to a logical "1" value. The Q-output (trigger signal 214) will remain a the logical "1" value, even if the S-input returns to the logical "0" value, until a logical "1" value is supplied to the R-input.

As FIG. 3 depicts, the R-input is supplied with a logical "1" value when at least one of three criteria are met. The first criterion is that a predetermined time period has past since the Q-output switched to the logical "1" value, the second criterion is that the above-mentioned exclusion criteria signal 222 (Exclusion_Criteria) is a logical "1" value, and the third criterion is that the flameout confirmation signal 218 (Flameout_Flag) from the flameout confirmation logic 204 is a logical "1" value. The first criterion, as is readily apparent, is implemented via the third confirm-on function 312 and the delay function 322. The second criterion is implemented via exclusion logic (described presently). The output of the delay function 322, the exclusion criteria signal 222, and the flameout confirmation signal 218 are each supplied to separate inputs of the second OR logic 316. The output of the second OR logic 316 is coupled to the R-input of the S/R latch 318.

Figure 6:
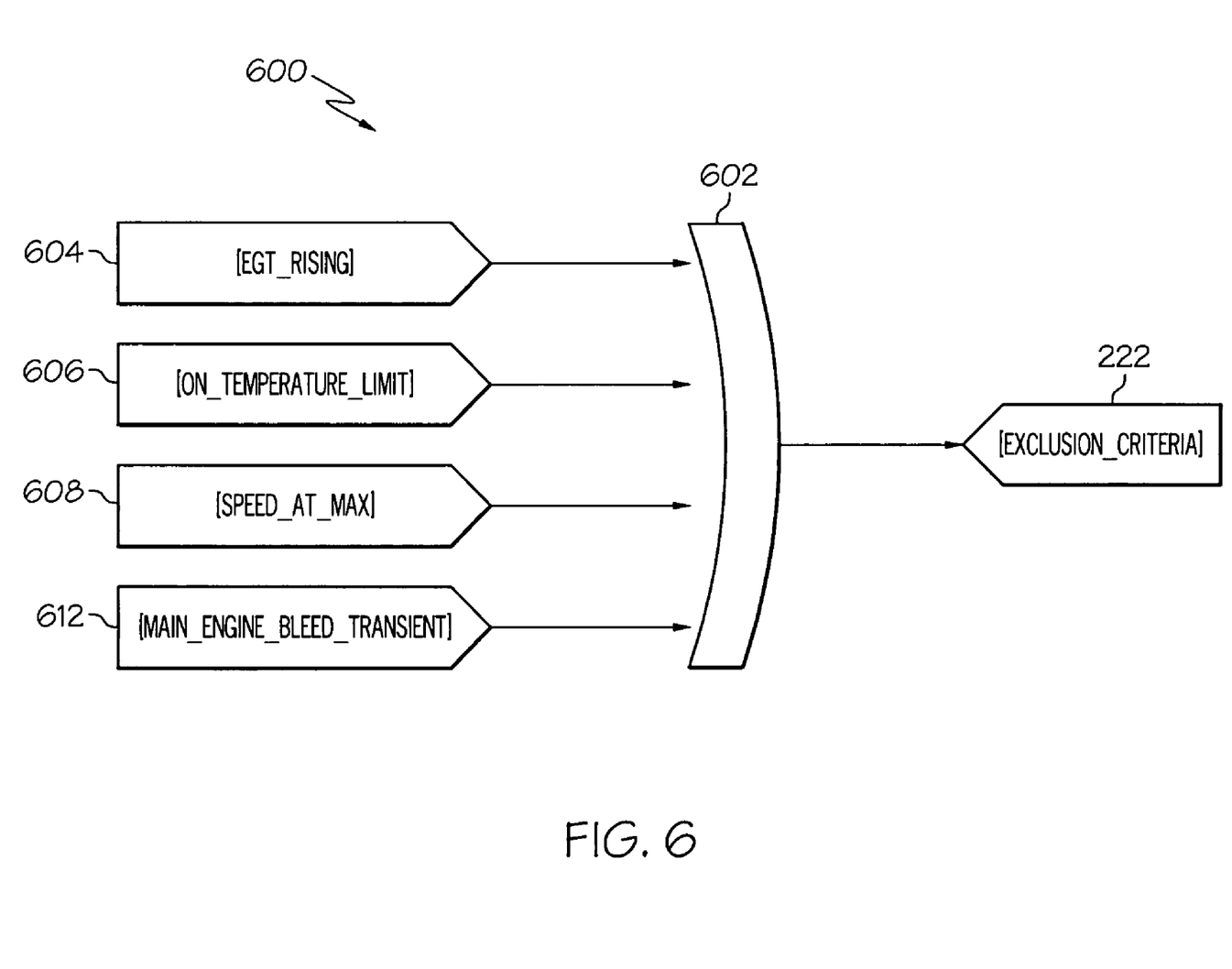
FIG. 6 depicts a schematic representation of exclusion logic that may be used to implement the control logic of FIG. 2.

Before proceeding with descriptions of particular implementations of the flameout confirmation logic 204 and the relight logic 206, a description of the just-mentioned confirmation logic will now be provided. In doing so, reference should be made to FIG. 6, which depicts the exclusion logic 600 as comprising four-input OR logic 602. A first input is coupled to receive an EGT_Rising value 604, a second input is coupled to receive an On_Temperature_Limit value 606, a third input is coupled to receive a Speed_at_Max value 608, and a fourth input is coupled to receive a Main_Engine_Bleed_Transient value 612. Each of these values 604-612 is a binary value (e.g., set to either a logical "1" value or logical "0" value), and each is supplied from non-illustrated logic within, or external to, the turbomachine controller 104. The EGT_Rising value 604 is set to a logical "1" value if the sensed EGT is rising. The On_Temperature_Limit value 606 is set to a logical "1" value if the sensed EGT is at a predetermined temperature limit. The Speed_at_Max value 608 is set to a logical "1" value if turbomachine rotational speed is at a predetermined speed limit. The Main_Engine_Bleed_Transient value 612 is set to a logical "1" value if external logic determines that the compressed air source is undergoing a transient. It will be appreciated that if any one or more of these values 604-612 is set to a logical "1" value, indicating that the associated criterion is met, then a logical "1" value is supplied to the R-input of the S/R latch 318, thereby preventing the flameout self-test logic 202 from triggering a flameout confirmation test. The particular criteria for preventing a flameout confirmation test may vary, but are selected based on operating criteria that indicate a flameout condition is either not possible or highly unlikely.

Turning now to FIG. 4, the flameout confirmation logic 204, to implement its functionality, includes a comparator 402, AND logic 404, a confirm-on function 406, and a S/R latch 408. The comparator 402 receives and compares the speed error value 208 and a second predetermined speed error value 412. If the speed error value 208 is greater than the second predetermined speed error value 412, then the comparator 402 supplies a logical "1" value, otherwise it supplies a logical "0" value. It will be appreciated that the second speed error value 412 may be equal to or non-equal to the first speed error value 324 that is used in the flameout self-test trigger logic 202. In the depicted embodiment, however, the first and second predetermined speed error values 324, 412 are non-equal, and the specific values are selected to meet desired operational characteristics.

The AND logic 404 includes three inputs. One input is coupled to the output of the comparator 402, another is coupled to receive the trigger signal 214 from the flameout self-test logic 202, and the third is coupled to receive the above-described maximum fuel limit value 216. The AND logic 404, as is generally known, will supply a logical "1" value to the confirm-on logic 406 whenever all of its inputs are receiving a logical "1" value. The confirm-on function 406 operates as described above. It will thus be appreciated that the confirm-on function 406 will supply a logical "1" value to the S-input of the S/R latch 408 only when all three of the AND logic inputs are at a logical "1" value for a third predetermined time period. That is, when the speed error value 208 is greater than the second predetermined speed error value 412, the trigger signal 214 is a logical "1" value, and the maximum fuel limit value 216 is a logical "1" value.

The function of the S/R latch 408 was previously described. In the context of the flameout confirmation logic 204 it will thus be appreciated that the Q-output of the S/R latch 408 (e.g., the flameout confirmation signal 218) goes to a logical "1" value whenever its R-input is supplied with a logical "0" value, and the speed error value 208 is greater than the second predetermined speed error value 412, the trigger signal 214 is a logical "1" value, and the maximum fuel limit value 216 is a logical "1" value. The Q-output will remain a the logical "1" value, even if the S-input returns to the logical "0" value, until a logical "1" value is supplied to the R-input.

The S/R latch R-input is supplied with a logical "1" value whenever predetermined flameout reset criteria are met. When these criteria are met, a reset signal 414 (Flameout_Reset_Criteria) transitions from a logical "0" value to a logical "1" value. The reset signal 414 is generated in non-illustrated logic that determines when the predetermined flameout reset criteria are met. The flameout reset criteria may vary, but in a particular embodiment these criteria are the system 100 is no longer operating in the bleed and burn mode operation, or a relight has been detected, or an overall system reset flag has been set.

Referring now to FIG. 5, an implementation of the relight logic 206 is depicted and, for completeness, will be briefly described. The depicted relight logic 206 includes a comparator 502, OR logic 504, AND logic 506, a confirm-on function 508, and an S/R latch 512. The comparator 502 receives and compares the speed error value 208 and a third predetermined speed error value 514. If the speed error value 208 is greater than the third predetermined speed error value 514, then the comparator 502 supplies a logical "1" value, otherwise it supplies a logical "0" value. It will be appreciated that the third speed error value 412 may be equal to or non-equal to the first and second speed error values 324, 412. In the depicted embodiment, the first and third predetermined speed error values 324, 514 are non-equal while the second and third predetermined speed error values 412, 514 are equal. As indicated before, the specific values are selected to meet desired operational characteristics.

The OR logic 504 includes two inputs, one of which is coupled to the output of the comparator 502 and the other of which is coupled to receive the above-described full bleed signal 224 (Full_Bleed_In_Use). Thus, whenever the speed error value 208 is greater than the third predetermined speed error value 514, or the full bleed signal 224 is at a logical "1" value, or both, then the OR logic 504 will supply a logical "1" to one input of the AND logic 506.

The AND logic 506 includes two inputs. One input is coupled to the output of the OR logic 504 and the other input is coupled to receive the flameout confirmation signal 218 (Flameout_Flag) from the flameout confirmation logic 204. The AND logic 506 will supply a logical "1" value to the confirm-on logic 508 whenever both of its inputs are receiving a logical "1" value. The confirm-on function 508 will supply a logical "1" value to the S-input of the S/R latch 512 when both of the AND logic inputs are at a logical "1" value for a fourth predetermined time period. The Q-output of the S/R latch 514 (Attempt_Relight) goes to a logical "1" value whenever its R-input is supplied with a logical "0" value, and both of the AND logic inputs are at a logical "1" value for the fourth predetermined time period. The Q-output will remain at the logical "1" value, even if the S-input returns to the logical "0" value, until a logical "1" value is supplied to the R-input.

The S/R latch R-input is supplied with a logical "1" value whenever predetermined relight reset criterion is met. When this criterion is met, a relight reset signal 516 (Relight_Reset_Criteria) transitions from a logical "0" value to a logical "1" value. The relight reset signal 516 is generated in non-illustrated logic that determines when the predetermined relight reset criterion is met. The relight reset criterion may vary, but in a particular embodiment the criterion is that a relight was unsuccessful after 4 seconds of attempting to relight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of detecting a flameout of an operating turbomachine that is configured to receive a controlled flow of bleed air from a bleed air source and a controlled flow of fuel from a fuel source, the method comprising the steps of:
    detecting that a value of an operational parameter within the turbomachine has varied by a predetermined amount; and
    triggering a flameout confirmation test that comprises the steps of:
        holding the controlled flow of bleed air constant,
        commanding an increase in turbomachine speed,
        confirming that a flameout has occurred by detecting that (i) the controlled fuel flow to the turbomachine is at a maximum fuel flow limit and (ii) actual turbomachine speed differs from the commanded turbomachine speed by a predetermined speed error.

2. The method of claim 1, wherein the operational parameter is one of a turbomachine speed error or a rate of change of a turbomachine temperature.

3. The method of claim 2, wherein the turbomachine temperature is turbomachine exhaust gas temperature.

4. The method of claim 2, wherein the predetermined rate of change is a negative value.

5. The method of claim 1, further comprising:
    attempting to relight the turbomachine if (i) the flameout is confirmed and (ii) a parameter associated with operation of the turbomachine is at least a predetermined value.

6. The method of claim 5, wherein the parameter associated with operation of the turbomachine is one of the predetermined speed error or the controlled flow of bleed air is at a limit.

7. The method of claim 1, further comprising:
    determining that the value of the operational parameter within the turbomachine has varied by the predetermined amount for at least a predetermined time.

8. The method of claim 1, further comprising selectively preventing the flameout confirmation test from being triggered regardless of whether the operational parameter has varied by the predetermined amount.

9. The method of claim 8, further comprising:
    a) determining if turbomachine exhaust gas temperature is rising;
    b) determining if turbomachine exhaust gas temperature is at a predetermined temperature limit;
    c) determining if turbomachine rotational speed is at a predetermined speed limit;
    d) determining if the bleed air source is undergoing a transient; and
    e) preventing the flameout confirmation test from being triggered if one or more of a)-d) is true.

* * * * *